3,519,694
STABILIZATION OF METHYL CHLOROFORM
Milton J. Blankenship, Midland, and Ralph McCarthy, Bay City, Mich., assignors to The Dow Chemical Company, Midland, Mich., a corporation of Delaware
No Drawing. Filed Oct. 22, 1965, Ser. No. 502,456
Int. Cl. C07c 17/40
U.S. Cl. 260—652.5                 9 Claims

ABSTRACT OF THE DISCLOSURE

The reaction of methyl chloroform with aluminum is substantially retarded or prevented by the presence in the methyl chloroform of a small amount of a substituted alkanecarboxylic acid or ester thereof having at least one ether linkage in the molecule. Substituents with ether linkages include alkoxyalkoxy radicals of up to 5 carbon atoms and alkoxy and aryloxy radicals of up to 10 carbon atoms.

---

This invention relates to the stabilization of methyl chloroform against decomposition in the presence of aluminum.

It is known that methyl chloroform reacts violently with aluminum, forming tars, gaseous reaction products and aluminum compounds of indeterminate structure.

It has now been found that this reaction may be substantially retarded or prevented by incorporating into the methyl chloroform an inhibiting amount of an acid or ester compound which contains at least one ether linkage in the molecule.

Typical ether-esters which may be used to inhibit the reaction of aluminum and methyl chloroform include compounds of the formula $$R_1-O-R_2-\overset{\overset{O}{\|}}{C}-O-R_3$$

wherein $R_1$ may be an alkoxyalkyl group of up to 5 carbon atoms or an alkyl or aryl group of up to 10 carbon atoms, $R_3$ may be hydrogen or any group enumerated for $R_1$ and $R_2$ is a divalent group of the formula

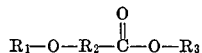

in which $n$ is an integer of from 1 to 3 and each R is independently a hydrogen atom, a lower alkyl group of from 1 to 4 carbon atoms (such as a methyl, ethyl, n-propyl, i-propyl, n-butyl, sec.-butyl, i-butyl or tert.-butyl group) or a corresponding lower alkoxy group of from 1 ot 4 carbon atoms. Examples of such compounds include the n-butyl ester of methoxyacetic acid, the benzyl ester of methoxypropionic acid, the decyl ester of ethoxyacetic acid, the octyl ester of methoxyacetic acid, the methyl ester of phenoxyacetic acid, the 2-methoxyethyl ester of methoxyacetic acid, the p-tolyl ester of methoxyacetic acid, the i-propyl ester of phenoxyacetic acid, the diethylacetal of acetoacetic acid, the methyl ester of methoxyacetic acid, the ethyl ester of methoxyacetic acid, the methyl ester of methoxypropionic acid, the methy ester of the dimethylacetal of glyoxylic acid, the methyl ester of the dimethylacetal of acetoacetic acid, the methylethylacetal of glyoxylic acid, the phenyl ester of phenoxyacetic acid, methoxyacetic acid, n-butoxyacetic acid and ethoxyacetic acid. Other suitable compounds are represented by appropriate choice of R, $R_1$, $R_2$ and $R_3$, as previously defined.

The inhibitor compounds of the invention may be used alone or in combination with other non-reactive inhibitors. Only an amount of inhibitor sufficient to retard or stop the reaction of aluminum and methyl chloroform is required. Ordinarily, amounts of inhibitor of from about 0.5 to 20 percent by weight (based on the total weight of the inhibited composition) are sufficient. For example, when ether acids or ether-ester compounds are used, the preferred concentration of the ether acid or ether-ester compound in the methyl chloroform is from about 1.0 to 5.0 percent by weight based upon the total weight of the composition.

The following examples are submitted for the purpose of illustration only and are not to be construed as limiting the scope of the invention in any way.

EXAMPLES I–IX General method

Varying amounts of different stabilizing compounds were added to 10 milliliters of totally uninhibited 1,1,1-trichloroethane (methyl chloroform). An aluminum coupon [designated alloy 1100 [1], 18 gage (approximately

---

[1] Aluminum alloy 1100 (standard designation of the Aluminum Association) is composed of (percent by weight):
(1) 99.00 percent aluminum (minimum)
(2) 1.0 percent Si and Fe (maximum)*
(3) 0.20 percent Cu (maximum)*
(4) 0.05 percent Mn (maximum)*
(5) 0.10 perdent Zn (maximum)*
* Total: less than 1.0 percent.

0.04 to 0.05 inch thick by 2½ inches by ½ inch)] was immersed in the test solution and scratched beneath the surface with a sharp instrument. The coupon was observed visually and the results are recorded in Table I according to the following standards:

Key Number:
3 _____ No reaction.
2 _____ Reaction starts but subsides (or stops) within 10 minutes.
1 _____ Reaction slows down, but continues after 10 minutes.
0 _____ Little or no inhibition; vigorous reaction.

TABLE I

| Example No. | Compound | Concentration (wt. percent) | Result |
|---|---|---|---|
| I | $CH_3OCH_2-\overset{\overset{O}{\|}}{C}-O-CH_3$ | 3.65<br>1.82<br>1.46<br>1.19<br>1.00 | 3<br>3<br>3<br>2<br>1 |
| II | $CH_3OCH_2\overset{\overset{O}{\|}}{C}-O-CH_2CH_3$ | 3.65<br>1.82 | 3<br>3 |
| III | $CH_3OCH_2CH_2\overset{\overset{O}{\|}}{C}-O-CH_3$ | 3.65<br>2.74 | 3<br>3 |
| IV | $CH_3O-\underset{\underset{OCH_3}{\|}}{\overset{\overset{H}{\|}}{C}}-\overset{\overset{O}{\|}}{C}-O-CH_3$ | 3.65 | 3 |
| V | $CH_3O-\underset{\underset{OCH_3}{\|}}{\overset{\overset{CH_3}{\|}}{C}}-CH_2\overset{\overset{O}{\|}}{C}-O-CH_3$ | 3.65 | 3 |
| VI | $CH_3O-CH_2\overset{\overset{O}{\|}}{C}-O-\left(CH_2\right)_7-CH_3$ | 3.65 | 3 |
| VII | $C_6H_5O-CH_2\overset{\overset{O}{\|}}{C}-OCH_3$* | 3.65 | 3 |
| VIII | $CH_3O-CH_2\overset{\overset{O}{\|}}{C}-OCH_2CH_2OCH_3$ | 3.65 | 3 |
| IX | $CH_3O-CH_2-COOH$ | 3.65<br>2.74<br>2.32<br>1.82<br>1.40 | 3<br>3<br>3<br>3<br>2 |

*$C_6H_5$—represents the phenyl group.

We claim as our invention:

1. A composition inhibited against attack by aluminum comprising methyl chloroform and an inhibiting amount of a compound (I) of the formula

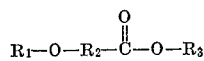

wherein:
(a) $R_1$ is selected from the group consisting of an alkyl group of no more than 10 carbon atoms and phenyl,
(b) $R_3$ is selected from the group consisting of the hydrogen atom, an alkoxyalkyl group of no more than 5 carbon atoms, an alkyl group of no more than 10 carbon atoms, phenyl, and tolyl, and
(c) $R_2$ is a divalent group of the formula

in which $n$ is one, and each R is independently selected from the group consisting of the hydrogen atom, and a lower alkoxy group of from 1 to 4 carbon atoms, at least one R being hydrogen.

2. The composition of claim 1 wherein each of $R_1$ and $R_3$ is a lower alkyl group and $R_2$ is a methylene group.

3. The composition of claim 1 wherein the compound (I) is

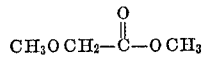

4. The composition of claim 1 wherein the compound (I) is

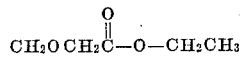

5. The composition of claim 1 wherein the compound (I) is

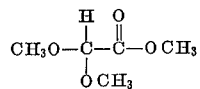

6. The composition of claim 1 wherein the compound (I) is

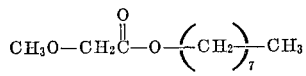

7. The composition of claim 1 wherein the compound (I) is

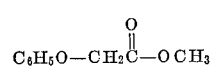

8. The composition of claim 1 wherein the compound (I) is

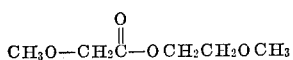

9. The composition of claim 1 wherein the compound (I) is

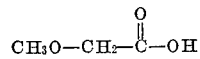

References Cited

UNITED STATES PATENTS

| | | | |
|---|---|---|---|
| 3,336,234 | 4/1964 | Speight | 260—652.5 |
| 2,371,645 | 3/1945 | Aitchison et al. | 260—652.5 |
| 2,595,636 | 5/1952 | Brighton et al. | 260—652.5 |
| 3,120,567 | 2/1964 | Dial | 260—652.5 |

FOREIGN PATENTS

| | | |
|---|---|---|
| 647,827 | 8/1964 | Belgium. |
| 418,230 | 10/1934 | Great Britain. |
| 998,517 | 7/1965 | Great Britain. |

LEON ZITVER, Primary Examiner

H. T. MARS, Assistant Examiner